(12) United States Patent
Walters et al.

(10) Patent No.: US 7,060,639 B1
(45) Date of Patent: Jun. 13, 2006

(54) NON-WOVEN INORGANIC FIBER MAT

(75) Inventors: John Walters, Sag (GB); Jocelyn Fitzsimons, Cork (IL)

(73) Assignees: BPB PLC, Slough (GB); Moy Isover Limited, Dublin (IE)

( * ) Notice: Subject to any disclaimer, the term of this patent is extended or adjusted under 35 U.S.C. 154(b) by 0 days.

(21) Appl. No.: 09/319,438

(22) PCT Filed: Jan. 23, 1998

(86) PCT No.: PCT/GB98/00203

§ 371 (c)(1),
(2), (4) Date: Jun. 7, 1999

(87) PCT Pub. No.: WO98/32579

PCT Pub. Date: Jul. 30, 1998

(30) Foreign Application Priority Data

Jan. 24, 1997 (GB) .................................. 9701500

(51) Int. Cl.
*B32B 9/00* (2006.01)

(52) U.S. Cl. ...................... 442/331; 442/400; 442/401; 442/402; 428/213; 428/218; 428/219

(58) Field of Classification Search ................ 162/152; 428/115, 212, 213, 219, 157, 60, 156, 167, 428/192, 338, 340, 193, 218; 442/327
See application file for complete search history.

(56) References Cited

U.S. PATENT DOCUMENTS 3,793,128 A * 2/1974 Chancellor, Jr. ............. 161/44
4,415,517 A * 11/1983 Timms ....................... 264/118
4,812,194 A * 3/1989 Pelz .......................... 156/307.3
4,869,942 A * 9/1989 Jennus et al. .................. 428/77

(Continued)

FOREIGN PATENT DOCUMENTS

DE           19507040           9/1996

(Continued)

OTHER PUBLICATIONS

Patent Abstracts of Japan; vol. 16, no 106; Mar. 16, 1992.

(Continued)

*Primary Examiner*—Cheryl A. Juska
*Assistant Examiner*—Arden B Sperty
(74) *Attorney, Agent, or Firm*—Birch, Stewart, Kolasch & Birch, LLP

(57) ABSTRACT

A non-woven mat of inorganic fiber is disclosed having a substance which is lower at the edges of the mat than in the remainder of the mat. Apparatus for making such a mat includes: a source of a slurry of inorganic fiber in a liquid; a forming wire disposed to move past the source, the liquid passing through the forming wire to deposit the inorganic fiber on the forming wire; a mask across a part of the width of the forming wire to hinder passage of the liquid through the forming wire over the part, the effectiveness of the mask varying in the direction of movement of the forming wire past the slurry source. A method of making the mat includes passing a forming wire past a slurry of inorganic fibers in a liquid while masking a part of the width of the forming wire as it passes through the slurry, the masking varying along the length of the forming wire as it passes through the slurry; and urging the slurry against the forming wire and causing the liquid to pass through the forming wire, whereby a non-woven mat of inorganic fiber is formed having an uneven substance (weight/unit area) in the cross direction.

11 Claims, 3 Drawing Sheets

U.S. PATENT DOCUMENTS 5,102,711 A * 4/1992 Keller et al. .................. 428/71
5,462,642 A * 10/1995 Kajander .................... 162/116
5,800,905 A * 9/1998 Sheridan et al. ............ 428/157

FOREIGN PATENT DOCUMENTS

| DE | 19507040 A1 | 9/1996 |
| EP | 0579007 A | 1/1994 |
| EP | 0579007 A2 | 1/1994 |
| FR | 981384 | 5/1951 |
| FR | 2504957 | 11/1982 |
| GB | 2053779 A | 2/1981 |
| GB | 2225594 | 6/1990 |
| GB | 2225594 A | 6/1990 |

OTHER PUBLICATIONS

Japanese Abstract: vol., 16, No. 106 (C-0919), Mar. 16, 1992.

* cited by examiner

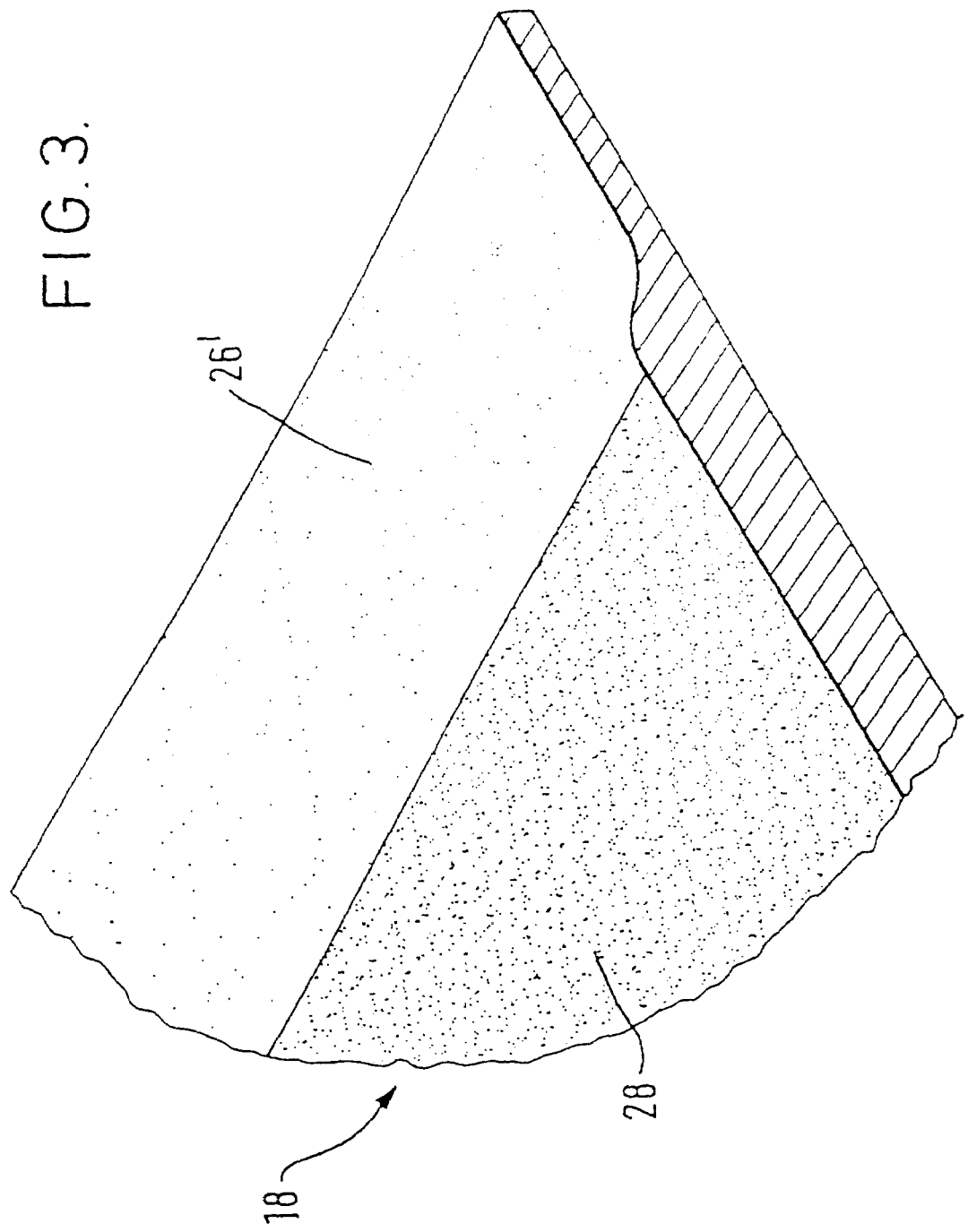

NON-WOVEN INORGANIC FIBER MAT

BACKGROUND OF THE INVENTION

1. Field of the Invention

This application is the national phase under 35 U.S.C. § 371 of PCT International Application No. PCT/GB98/00203 which has an International filing date of Jan. 23, 1998, which designated the United States of America.

This invention relates to a non-woven inorganic fiber mat such as a glass fibre mat and to a method and apparatus for the production thereof. The present invention also relates to the use of the mat in building boards, such as gypsum building boards.

2. Description of Background Art

A particularly useful form of building board is known as glass reinforced gypsum board (GRG). GRG board and its manufacture is described in GB-A-2 053 779. GRG board is of generally conventional appearance and is composed of a gypsum with a non-woven glass mat immediately below one or both principal surfaces. The mat is introduced into the core by vibrating the core slurry, over- or underlain by the mat, to cause it to pass through the mat, so that the surface layer or layers of gypsum are integral with the core. GRG boards are stronger than conventional boards and exhibit superior fire resistance.

In the manufacture of GRG board the need to provide strength by employing non-woven glass fiber mat of relatively low diameter (for example, 13 µm) fibers conflicts with the need to ensure efficient exhaustion through the mat of air from the gypsum slurry from which the board is formed; this is a particular problem at the edge margins of the board where the bottom mat is brought up and onto the upper surface of the board to define the edges of the uncut board. Inefficient exhaustion of air in this region can lead to voids in the edge margins of the cut boards, reducing the edge strength of the boards.

The problem of voids in the edge margins has been dealt with by increasing the fiber diameter of the mat, particularly the bottom mat (to for example 16 µm), allowing easier exhaustion of air and penetration of gypsum slurry but reducing board strength. However, the use of higher diameter fibers has been found to decrease the strength of the mat. Reduction of the mat substance (weight/unit area), which would allow the gypsum slurry to penetrate the mat more readily, would lead to an unacceptable reduction in board strength.

SUMMARY OF THE INVENTION

The need to allow sufficient time for the gypsum slurry to penetrate the mat means that the line speed of the plasterboard manufacturing line is lower than would be the case were adequate exhaustion of air from the edge margins easier.

It has been desired to provide a GRG building board which can be manufactured at relatively high speed, is of high strength by virtue of using a mat of relatively low diameter fibers and the edge margins of which have a low level of voids.

According to the invention there is provided a non-woven mat of inorganic fiber having a substance (weight/unit area) which varies in the cross direction.

Preferably, the edge margins are of lower substance than the remainder of the mat.

Also, according to the invention there is provided a method of making a non-woven mat of inorganic fiber having a substance which varies in the cross direction comprising:

passing a forming wire past a slurry of inorganic fibers in a liquid while masking a part of the width of the forming wire as it passes through the slurry, the masking varying along the length of the forming wire as it passes through the slurry; and urging the slurry against the forming wire and causing the said liquid to pass through the forming wire, whereby a non-woven mat of inorganic fiber is formed having an uneven substance in the cross direction (the cross direction is the direction on the mat generally perpendicular to the direction in which the mat runs through the machine, which is the machine direction).

Also according to the invention there is provided apparatus for forming a non-woven mat of inorganic fiber having a substance which varies in the cross direction comprising:

a source of a slurry of inorganic fiber in a liquid;

a forming wire disposed to move past the said source, through which, in use, the said liquid passes to deposit the said inorganic fiber on the forming wire;

a mask across a part of the width of the forming wire to hinder passage of the said liquid through the forming wire over the said part, the effectiveness of the mask varying in the direction of movement of the forming wire past the said source.

Preferably, the mask is disposed across a portion of the forming wire corresponding to the edge margins of the formed mat.

Also preferably, the effectiveness of the mask decreases in the direction in which the forming wire is disposed to move.

Also preferably, the mask is a blinding plate impinging the face of the forming wire remote from the source of slurry.

Also preferably, the effective width of the blinding plate decreases in the direction in which the forming wire passes the slurry.

The invention also provides a cementitious board having a sheet of a non-woven mat of inorganic fiber according to the invention embedded immediately below at least one surface.

In a further aspect, the invention also provides a cementitious board having a sheet of a non-woven mat of inorganic fiber embedded immediately below at least one surface wherein the permeability of the mat to cementitious slurry varies across the mat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be further described by way of example, with reference to the drawings in which:

FIG. 3 shows a cross sectional view through a glass fiber mat according to the invention.

DESCRIPTION OF THE PREFERRED EMBODIMENTS

Figure 1:
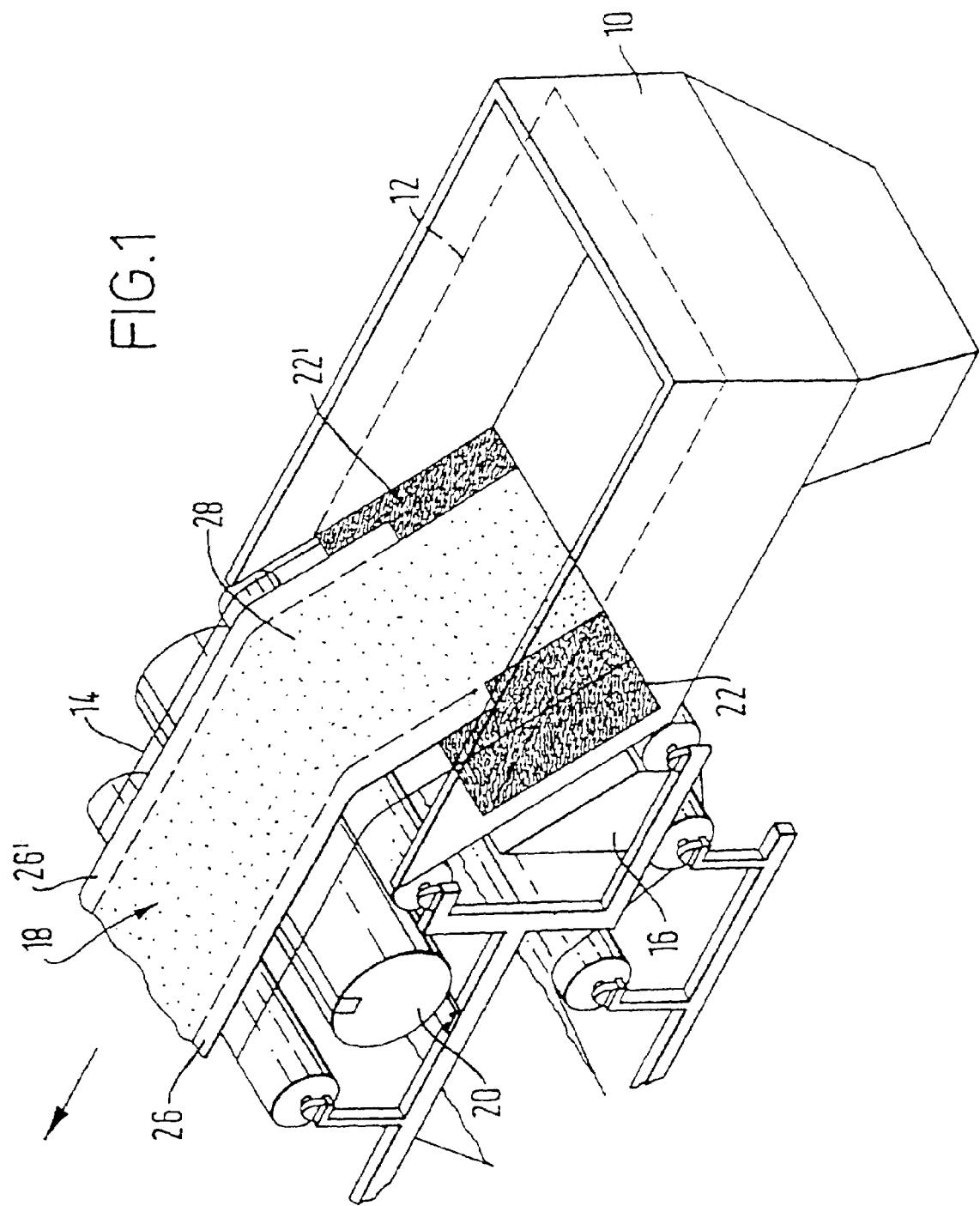
FIG. 1 shows, diagrammatically, a perspective view of an inclined wire glass fibre mat former embodying the invention.

The former shown in FIG. 1 comprises a flowbox 10 containing an aqueous slurry of chopped glass fiber and conventional additives up to the level indicated by the broken line 12. The slurry is continuously supplied to the flowbox 10 from below. A continuous forming wire 14, shown transparent in FIG. 1 for clarity, passes through the flowbox 10 at an angle to the vertical and the horizontal in the direction shown by the arrow in FIG. 1. Slurry is drawn through the wire 14 and into a suction box 16 by a conventional slurry pumping system to form a mat 18 of glass fibers on the wire. Shortly after leaving the flowbox 10, the forming wire 14 carrying the mat 18 of fibers passes over a vacuum header 20 which draws water from the mat 18. The mat 18 on the forming wire 14 then has adhesive applied to it and is dried and wound into a roll, in a conventional manner. The other rollers and the frame shown in FIG. 1 are conventional.

Figure 2:
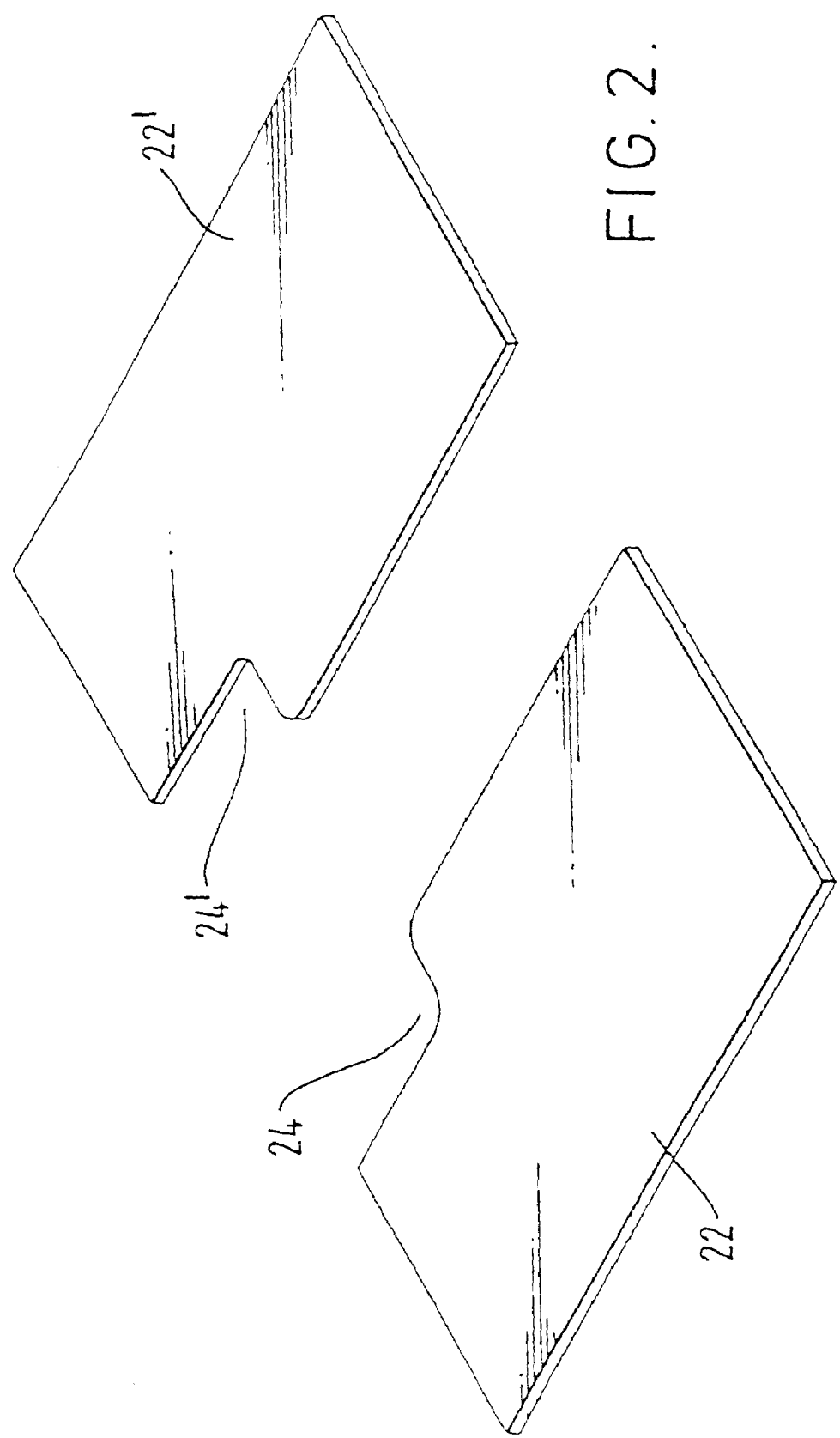
FIG. 2 shows a blinding plate for use in the apparatus and method of the invention.

Blinding plates 22,22', shown also in FIG. 2, are placed in the flowbox 10 between the edge margins of the forming wire 14 and the suction box 16; the forming wire 14 passes across their surface. The blinding plates 22,22' are generally rectangular with a rectangular cut out 24,24' from their inside downstream (relative to the forming wire 14) corner. The presence of the blinding plates 22,22' as the wire starts to pass over the suction box 16 prevents the passage of slurry through the forming wire 14 in the region underlain by the blinding plates and so no glass fibers accumulate on the wire. As the wire 14 passes over the cut outs 24,24' from the blinding plates, slurry passes through the edge margins of the wire previously underlain by the blinding plates and glass fiber mat accumulates. The central portion of the forming wire 14 is not masked at all by the blinding plates 22,22', and so the glass fiber mat accumulates there throughout the passage of the forming wire over the suction box. In addition, since the blinding plates 22,22' extend across the entire widths of the edge margins, the flow of slurry through the forming wire is generally uniform across the entire widths of the edge margins. In view of this the substance weight/unit area is generally uniform across the entire widths of the edge margins.

The effect of this differential accumulation of glass fibers is to make a mat having edge portions 26,26' of lower substance (weight/unit area) than the central portion 28. This may be seen in FIG. 3. The substance of the edge margins 26,26' of the mat can be controlled by the size of the cut-outs 24,24' from the blinding plates 22,22' and the position of the blinding plates relative to the suction box 16. Factors such as the concentration of fibers in the slurry, the speed of the forming wire and the speed with which the slurry is drawn through the forming wire, which generally affect the deposition of fibers on the wire and thus the substance of the mat will also affect the substance of the edge margins 26,26' of the mat 18.

Glass fiber mats according to the invention find particular application in the manufacture of GRG board, described in GB-A-2 053 779. The mat is introduced into the core by vibrating the core slurry, over- or underlain by the mat, to cause it to pass through the mat, so that the surface layer or layers of gypsum are integral with the core. The lower substance of the edge margins of the mats allow air trapped in the slurry to pass readily through the edge margins of the mat. This avoids the formation of undesirable voids in the edge margins of the board, improving edge strength. Preferred mats for this purpose are of 13 μm diameter glass fibers and have a central substance of about 60 g/m² and an edge margin substance of about 27 g/m².

Blinding plates of the invention may be of any desired size and shape to achieve the desired substance distribution across the width of the mat. They may be located at one or both edge margins of the forming wire 14, or one or more may be disposed across the width of the wire. The blinding plates may rest on the wire or be otherwise disposed over the wire but are preferably under it, between it and the suction box 16.

Instead of separate blinding plates, deposition of fibers on the forming wire can be inhibited by treating the wire itself, for example by painting over small areas in regions of the wire to be masked, so that less slurry passes through the wire in these regions, reducing the fiber deposition and thus mat substance. Alternatively, the weave of the forming wire can be made closer in some regions, again reducing the flow of slurry through these regions.

The mats of the invention allow the provision of GRG type plasterboard of improved strength especially at the edge margins. Plasterboard having the same strength edge margins as current GRG boards can be manufactured at higher speeds than are currently possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A non-woven mat of glass fiber, comprising:
said mat having a substance weight/unit area varying in a cross direction; and
at least one edge margin of said mat is of lower substance weight/unit area than the remainder of said mat,
wherein the substance weight/unit area of the at least one edge margin is generally uniform across an entire width of the at least one edge margin, and said mat is permeable to a gypsum plaster slurry.

2. The mat according to claim 1, wherein opposed edge margins of said mat are of lower substance weight/unit area than the remainder of said mat.

3. A cementitious board having a sheet of a non-woven mat of glass fiber according to claim 1 embedded immediately below at least one surface thereof.

4. A cementitious board having a sheet of a non-woven mat of glass fiber according to claim 2 embedded immediately below at least one surface thereof.

5. The mat according to claim 1, wherein said mat is made of a single layer of non-woven glass fiber.

6. The mat according to claim 2, wherein said mat is made of a single layer of non-woven glass fiber.

7. A cementitious board having a sheet of a non-woven mat of glass fiber according to claim 5 embedded immediately below at least one surface thereof.

8. A cementitious board, comprising:
a body of cementitious material; and
a non-woven mat of glass fiber embedded immediately below at least one surface of said body, said mat having a substance weight/unit area varying in a cross direction, and at least one edge margin of said mat is of lower substance weight/unit area than the remainder of said mat, wherein the substance weight/unit area of the at least one edge margin is generally uniform across an entire width of the at least one edge margin, and said mat is permeable to a gypsum plaster slurry.

9. The cementitious board according to claim 8, wherein opposed edge margins of said mat are of lower substance weight/unit area than the remainder of said mat.

10. The cementitious board according to claim 8, wherein said mat is made of a single layer of non-woven glass fiber.

11. The cementitious board according to claim 9, wherein said mat is made of a single layer of non-woven glass fiber.

* * * * *